Patented Dec. 10, 1929

1,739,307

UNITED STATES PATENT OFFICE

HARRY N. HOLMES, OF OBERLIN, OHIO

IMPREGNATION OF POROUS GELS WITH A SOLID MATERIAL

No Drawing.    Application filed August 13, 1927. Serial No. 212,829.

This invention relates to a method of depositing coatings of solid material, such as oxides, hydroxides, sulfides, or the like, in porous solids. The invention has for its object to provide a method by which the solid material is deposited uniformly throughout all cavities and pores, with the ability to readily free the porous material from all traces of undesirable material, such as soluble salts, and to insure penetration of the material to be deposited throughout the lump or mass of porous material.

In the broad sense the invention contemplates the deposition of the solid material by the reaction between two substances which under certain conditions do not react with each other and under other conditions do react with each other, by first distributing or diffusing the two substances through the pores of the porous solid under the first conditions, followed by a change to the second condition with accompanying reaction and deposition. Several instances of such substances and conditions will be apparent to chemists. One thereof, forming the subject matter of my co-pending application for Impregnation of porous gels with metals or other insoluble material, filed of even date herewith, Ser.No. 212,828, utilizes two substances, such as formalin solution and slightly basic chloro-platinic acid which do not react appreciably at room temperature or lower but will precipitate metallic platinum at about 100° C. The change in conditions here is the change in temperature and the two substances, either separately or otherwise, are distributed through the porous solid at a low temperature and with the substances in situ reaction occurs when the temperature is raised. Further details of this method will be apparent from inspection of the aforesaid co-pending application, to which reference may be had for the purpose. A second instance of such substances and conditions forms the subject matter of the present application.

Briefly described, the present method takes advantage of those special conditions under which one soluble substance, such as a salt, in solution, may be caused to react with another substance, such as a gas, in solution, for the deposition of desirable material, by first introducing the soluble salt into the pores as a solution, bringing the reacting gas into contact with the salt under conditions in which reaction cannot occur, and subsequently producing solution and reaction by the introduction of a suitable pore penetrating solvent liquid, such as water. This method avoids the non-penetrating surface effect which usually results when a porous material soaked with a solution of one reagent is subjected to the effect of a second reagent, thereby producing deposition in the surface pores and clogging or choking the porous material, so that the precipitating reaction does not continue to the center of the lumps or masses.

The invention is capable of use for the deposition of numerous solid materials in porous solids under the conditions described, but certain specific reactions will be presented in detail for more complete understanding of the invention.

The porous solid may be of any suitable form provided with either or both of microscopic or ultra-microscopic pores, such as a silica gel, and, for example, may be the silica gel described in my prior application Ser. No. 56,077, filed September 12, 1925, or in the application filed jointly by myself and John A. Anderson, Ser. No. 656,716, filed August 10, 1923. Such a silica gel is crushed or otherwise reduced to fragments of suitable size, say to half the size of a grain of wheat, and is soaked with a water solution of a suitable metallic salt, such as a molar solution of ferric chloride, the soaking being permitted to continue for a few minutes at room temperature. Solutions of other concentrations than that specified are also suitable. Diffusion or penetration of the solution through and into the pores is rapid and complete in a short time. The fragments are then dried so that the dried solid,—in this case ferric chloride—occupies only a part of the pore volume. The drying should be carried on in a manner to prevent any possible deleterious effect upon either the salt or other material deposited or upon the structure of the porous solid, and preferably should be carried on at a temperature slightly above 100° C. until practically all of the water is driven off. The solid is now cooled to room temperature or lower and a stream of a suitable gas, in this case dry ammonia gas or air containing the same gas, is passed over or through the gel until adsorption is practically complete. The first step with the ferric chloride has left a film of solid reacting material uniformly deposited by encrustation on the walls or in a fraction of the free space of every pore, but obviously without materially disturbing interpore communication. When the gas is passed over the gel it also diffuses rapidly and completely throughout all of the now encrusted pores or chambers.

The gel is now moistened with water in quantity somewhat more than sufficient to fill the gel. Complete water diffusion occurs promptly. As the water reaches and enters each pore it dissolves both the encrusted soluble salt and the gas, with a consequent immediate reaction between the salt and gas solutions and in this case with the precipitation of hydrous ferric oxide, commonly known as ferric hydroxide, from a remaining solution containing ammonium chloride.

The wet porous solid is now drained and is washed in repeated changes of pure water, preferably heated, until the washings are free from soluble salts, although in some cases washing, or at least complete washing, is not essential. The impregnated gel is now dried in any desired manner, again taking care not to injure either the deposited material or the gel structure, such as by not allowing the temperature to exceed say 600° C. The ferric oxide is thus uniformly distributed throughout the gel without completely clogging the capillaries, with the ability to catalytically aid reaction of mixtures of gases which can thereby be brought into excellent contact with the greatly extended surface of the active ferric oxide in the gel.

It is also possible to secure a deposit of mixed oxides by initially impregnating the gel with a mixture of solutions of two or more metallic salts, followed by drying, diffusion of the reacting gas into the capillaries, and the introduction of water or other suitable liquid to produce solution and precipitation, as before.

Silver sulphide may be deposited uniformly throughout the porous solid by first soaking the dry gel in a silver nitrate solution of suitable strength, such as molar strength, then drying, heating to approximately 100°, cooling, allowing dry hydrogen sulphide gas to diffuse throughout, say to the point of saturation, and then moistening with sufficient water to dissolve both the salt and the hydrogen sulphide gas to permit their immediate reaction. The precipitate may be washed or not, as desired.

What I claim is:

1. The method of impregnating a dry rigid-walled porous gel containing microscopic and ultar-microscopic pores with catalytic material, consisting in causing two substances which under certain conditions react upon each other to form catalytic material but which under other conditions do not materially react with each other to become uniformly distributed or diffused through the pores under said other conditions, and then with said substances in situ subjecting the porous solid to said first named condition under which reaction between said substances will occur, thereby depositing solid catalytic material in substantially all of the pores of the porous gel.

2. The method of impregnating a dry rigid-walled porous gel containing miscroscopic and ultra-microscopic pores with catalytic material, consisting in introducing into substantially all of the capillaries of the porous solid a soluble substance and a soluble gas capable of reacting therewith to precipitate the desired catalytic material, and then causing diffusion through the capillaries of a solvent in which the precipitating reaction takes place.

3. The method of impregnating a dry rigid-walled porous gel containing microscopic and ultra-microscopic pores with catalytic material, consisting in causing diffusion through substantially all of the capillaries of a solution of a substance adapted to react with a solution of a suitable gas to form the desired catalytic material, drying, causing said gas to diffuse through the capillaries, and introducing into the capillaries a solvent for both said gas and reacting substance, to thereby produce deposition in substantially all of the capillaries of the desired catalytic material.

4. The method of impregnating a dry rigid-walled porous gel containing microscopic and ultra-microscopic pores with catalytic material, consisting in causing diffusion through substantially all of the capillaries of a solution of a substance adapted to react with a solution of a suitable gas to form the desired catalytic material, drying, causing said gas to diffuse through the capillaries, and introducing into the capillaries a solvent for both said gas and reacting substance, to thereby produce deposition in substantially all of the capillaries of the desired material, washing out excess soluble reacting substance, and drying.

5. The method of impregnating a dry rigid-walled porous gel containing microscopic and ultra-micropscopic pores with catalytic material, consisting in separately introducing into substantially all of the capillaries a dried deposit of a solid substance and also a gas capable of reacting with a solution of the solid substance to produce a deposit of catalytic material, and causing diffusion throughout the capillaries of a solvent for said deposit and gas and forming the desired material in substantially all of the capillaries.

In testimony whereof I hereby affix my signature.

HARRY N. HOLMES.